(12) United States Patent
Karnik et al.

(10) Patent No.: US 10,171,477 B1
(45) Date of Patent: Jan. 1, 2019

(54) AUTHENTICATED DATA STREAMING

(71) Applicant: Amazon Technologies, Inc., Seattle, WA (US)

(72) Inventors: Ameya Karnik, Seattle, WA (US); Stefano Stefani, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 137 days.

(21) Appl. No.: 15/432,809

(22) Filed: Feb. 14, 2017

(51) Int. Cl.
*H04L 29/06* (2006.01)
*H04L 29/08* (2006.01)
*H04L 9/32* (2006.01)

(52) U.S. Cl.
CPC .......... *H04L 63/123* (2013.01); *H04L 9/3242* (2013.01); *H04L 65/4069* (2013.01); *H04L 67/02* (2013.01)

(58) Field of Classification Search
None
See application file for complete search history.

(56) References Cited

U.S. PATENT DOCUMENTS

| 7,467,202 B2* | 12/2008 | Savchuk | H04L 63/0245 709/224 |
| 8,805,963 B2* | 8/2014 | Pantos | H04L 65/1083 709/219 |
| 2003/0167355 A1* | 9/2003 | Smith | G06F 8/20 719/328 |
| 2006/0173985 A1* | 8/2006 | Moore | G06F 17/3089 709/223 |
| 2006/0206711 A1* | 9/2006 | Chakraborty | H04L 63/12 713/170 |
| 2006/0209794 A1* | 9/2006 | Bae | H04L 12/6418 370/352 |
| 2007/0022289 A1* | 1/2007 | Alt | H04L 63/0272 713/168 |
| 2007/0121596 A1* | 5/2007 | Kurapati | H04L 29/06027 370/356 |
| 2012/0221955 A1* | 8/2012 | Raleigh | H04M 15/00 715/736 |

(Continued)

OTHER PUBLICATIONS

Gruschka, Nils; Iancono, Luigi Lo. Server-Side Streaming Processing of Secured MTOM Attachments. 2010 Eighth IEEE European Conference on Web Services. https://ieeexplore.ieee.org/stamp/stamp.jsp?tp=&arnumber=5693239 (Year: 2010).*

(Continued)

*Primary Examiner* — Jeremiah L Avery
(74) *Attorney, Agent, or Firm* — Davis Wright Tremaine LLP

(57) ABSTRACT

A data-collecting device acquires data associated with a real-time data stream and transmits the data to a data-consuming service hosted on a server computer system in the form of a multipart response. The multipart response includes one or more data content parts and at least one authentication content part. Each of the one or more data content parts contains data representing part of the real-time data stream. Each authentication content part includes authentication information usable to verify the integrity of the data transmitted in the data content parts transmitted prior to the authentication content part.

20 Claims, 10 Drawing Sheets

(56) References Cited

U.S. PATENT DOCUMENTS

| | | | |
|---|---|---|---|
| 2013/0104251 A1* | 4/2013 | Moore | G06F 21/602 |
| | | | 726/30 |
| 2014/0201838 A1* | 7/2014 | Varsanyi | G06F 21/552 |
| | | | 726/23 |
| 2014/0344391 A1* | 11/2014 | Varney | H04L 41/50 |
| | | | 709/213 |
| 2018/0191740 A1* | 7/2018 | Decenzo | H04L 63/1408 |

OTHER PUBLICATIONS

Li, Jenny et al. An Adaptable Architecture for Secure Delivery of Converged Services. The Sixth International Symposium on Autonomous Decentralized Systems, 2003. https://ieeexplore.ieee.org/stamp/stamp.jsp?tp=&arnumber=1193931 (Year: 2003).*

Tanimura, Yusuke et al. A High Performance, QoS-enabled, S3-based Object Store. 2014 14th IEEE/ACM International Symposium on Cluster, Cloud and Grid Computing. https://ieeexplore.ieee.org/stamp/stamp.jsp?tp=&arnumber=6846531 (Year: 2014).*

"7.2 The Multipart Content-Type," RFC1341 (MIME), <http://www.w3.org/Protocols/rfc1341/7_2_Multipart.html> [retrieved Feb. 14, 2017], 7 pages.

Nguyen, H., "Under the Hood: An HTTP Request With Multipart/Form-Data," <https://www.huyng.com/posts/under-the-hood-an-http-request-with-multipartform-data> [retrieved Feb. 14, 2017], Feb. 6, 2011, 2 pages.

* cited by examiner

AUTHENTICATED DATA STREAMING

BACKGROUND

Data collection is an important part of many computerized control systems. Many modern control systems require access to significant amounts of low-latency real-time data. In these and other systems, data collection can be expensive and time-consuming. What is needed is a fast, accurate and less expensive way of collecting data in these systems.

BRIEF DESCRIPTION OF THE DRAWINGS

Various techniques will be described with reference to the drawings, in which.

DETAILED DESCRIPTION

Figure 1:
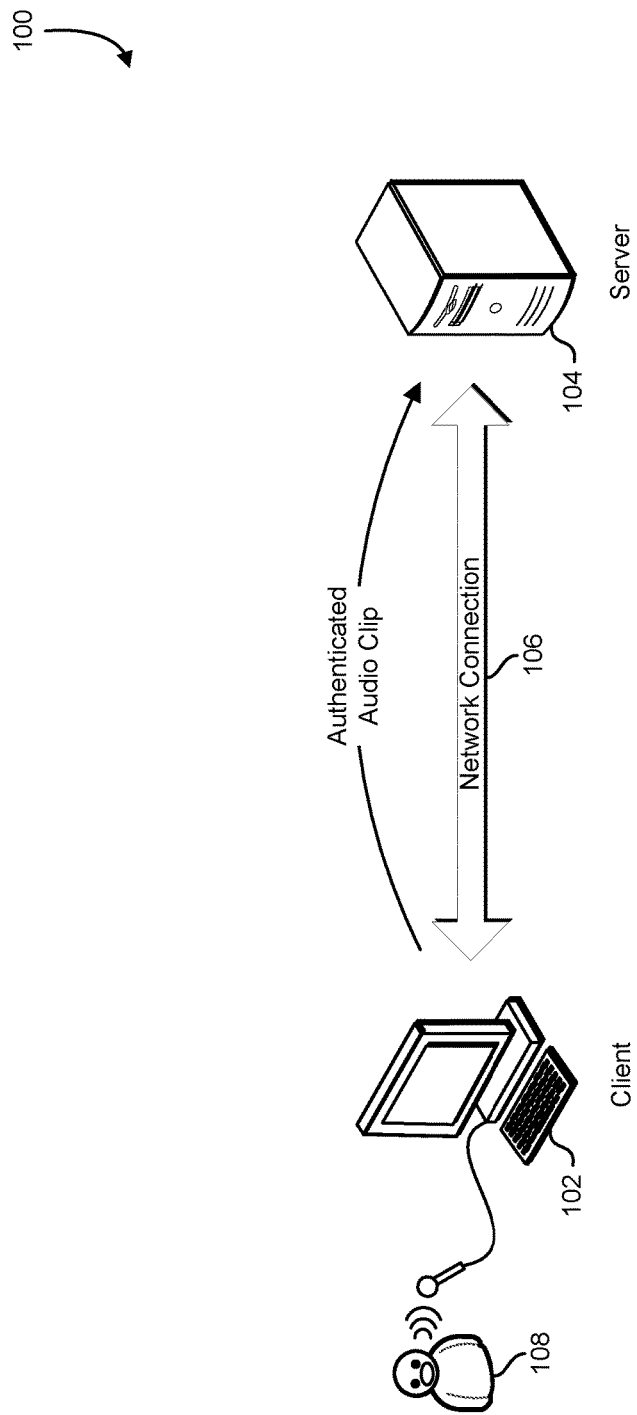
FIG. 1 shows an environment in which one embodiment may be practiced.

The present document describes embodiments of a protocol that allows a data collection device to stream authenticated data to a server over a network. In one embodiment, the data collection device collects data over time which is streamed to a server that hosts a data-consuming service. In one embodiment, the data is real-time data such as audio samples, a video stream, or periodically collected environmental data. In one embodiment, the data collection service provides authentication information to the server that allows the server to verify the integrity of the streamed data. In one embodiment, the authentication information is a cryptographic hash, a checksum, or a message authentication code. In one embodiment, the data and the authentication information are transmitted from the data collection device to the service in a multipart message having a plurality of content parts. Each content part may be one of several content-part types. In one embodiment, an individual content part is a data part that includes an amount of collected data or an authentication part that includes authentication information that is used to verify data in one or more content parts. In one embodiment, content parts are transmitted sequentially and, in general, authentication information for a particular data part is transmitted after the particular data part is transmitted.

In one embodiment, the data and the authentication information are transmitted to the server via a computer network in the form of an HTTP multipart request. In one embodiment, HTTP multipart content includes a header and one or more content parts following the header. In one embodiment, the header of the HTTP multipart content includes information that describes the format the content parts. In one embodiment, the HTTP multipart response header includes a tag identifying the content type as "Content-type: multipart/mixed." In one embodiment, the HTTP multipart response header specifies a boundary tag that is used to separate the content parts. In one embodiment, the boundary value is chosen at random so as to make it unlikely that the boundary is located in the data. For example, a boundary tag can be specified as "boundary="H53ukGd969f 78hs5gg4juo56u"."

The body of the HTTP multipart content, in one embodiment, follows the header, and includes at least two content parts. In one embodiment, the first content part comprises data collected by the data collection device, and a second data part following the first content part comprises authentication information for the data in the first content part. In one embodiment, the body of the HTTP multipart content includes a plurality of pairs of content parts, each pair having a first data content part and a second authentication information content part. In one embodiment, the body of the HTTP multipart content includes a plurality of data content parts and an authentication information content part that includes authentication information for the data content parts. In one embodiment, each content part of the HTTP multipart content is separated by the boundary tag identified in the header and includes a content-type tag that identifies a data encoding used in the content part.

Authentication information can be determined from collected data in a variety of ways. In one embodiment, authentication information is used to authenticate data from the beginning of the HTTP multipart content to the location where the authentication information is present. In one embodiment, the entire multipart content can be verified by verifying the final piece of authentication information in the final content authentication part. In one embodiment, each piece of authentication information is used to authenticate a prior data content part, and authenticating the entire multipart content involves verifying each piece of authentication information in each authentication data part. In one embodiment, authentication information is updated as data is collected. In one embodiment, if the data is no longer needed to update authentication information, the data is transmitted to the server and deleted from memory on the data collection device.

In one embodiment, by placing authentication information in a content part of an HTTP multipart content transmission after data to which the authentication information applies, the data collection device is able to transmit the data to the server in parallel with determining the authentication information. In one embodiment, when compared to alternatives in which authentication information precedes the data, latency between data acquisition and transmission is reduced, and the amount of memory used for transmission buffering is decreased.

FIG. 1 shows an environment in which one embodiment may be practiced. A system diagram 100 shows an embodiment where a client computer system 102 collects and transmits an authenticated audio stream to a server computer system 104 over a network connection 106. In one embodiment, the client computer system 102 is a mobile device such as a cell phone, tablet computer, or wearable device. In one embodiment, the client computer system 102 is a network-connected appliance, data acquisition device, or personal computer system. In one embodiment, the server computer system 104 can be a data aggregation device, Web server, server cluster, or online service provider. In one embodiment, the server computer system 104 hosts a data-consuming service that receives and processes the data provided by the client computer system 102. In one embodiment, the network connection 106 is a wired network connection such as an Ethernet connection, fiber-optic network connection, a universal serial bus ("USB") connection, a FireWire connection, or instrumentation bus connection. In one embodiment, the network connection 106 is a wireless network connection such as a Wi-Fi connection, a ZWAVE or Zigbee connection, an infrared network connection, or a dual-band wireless and wired connection.

In one embodiment, a user 108 speaks commands into a microphone which is connected to the client computer system 102. In one embodiment, the client computer system recognizes that the user 108 is speaking, and acquires audio samples via a microphone. In one embodiment, the client computer system 102 initiates a network connection to the server computer system 104 and sends an HTTP multipart request header to the server computer system 104. In one embodiment, as audio samples are collected, the client computer system 102 updates authentication information in the form of a rolling hash. In one embodiment, as the rolling hash is updated, the processed audio samples are transmitted to the server computer system 104 as a data content part. In one embodiment, the server computer system 104 forwards the received audio samples as they are received from the client computer system 102 to the data-consuming service despite not having yet received the authentication information. In one embodiment, the client computer system 102 continues acquiring and sending audio samples to the server computer system 104 until a data content part termination event is determined. In one embodiment, a data content part can be terminated based at least in part on an amount of elapsed time, a quantity of data transmitted, or a signal provided by the user 108. In one embodiment, when the data content part is terminated, the client computer system begins an authentication content part, and sends the authentication data to the server computer system 104.

In one embodiment, after the server computer system 104 notes the end of the data content part, the server computer system 104 signals the data-consuming service that the data is complete. In one embodiment, the data-consuming service elects to process the data prior to verification to further reduce data processing latency. In one embodiment, the server computer system 104 verifies the data using the authentication information. In one embodiment, the server determines a hash for data before sending the data to the data-consuming service, and then compares the hash to authentication information received from the client computer system 102. In one embodiment, the server updates a rolling hash as data is received from the client computer system 102. In one embodiment, the data is forwarded to the data-consuming service as the rolling hash is updated and no longer needed by the server computer system 104. In one embodiment, when the authentication information is received from the client computer system, the authentication information is compared to the rolling hash to verify the received data. In one embodiment, the result of the verification (authenticated or not authenticated) is provided to the data-consuming service by the server computer system 104.

Figure 2:
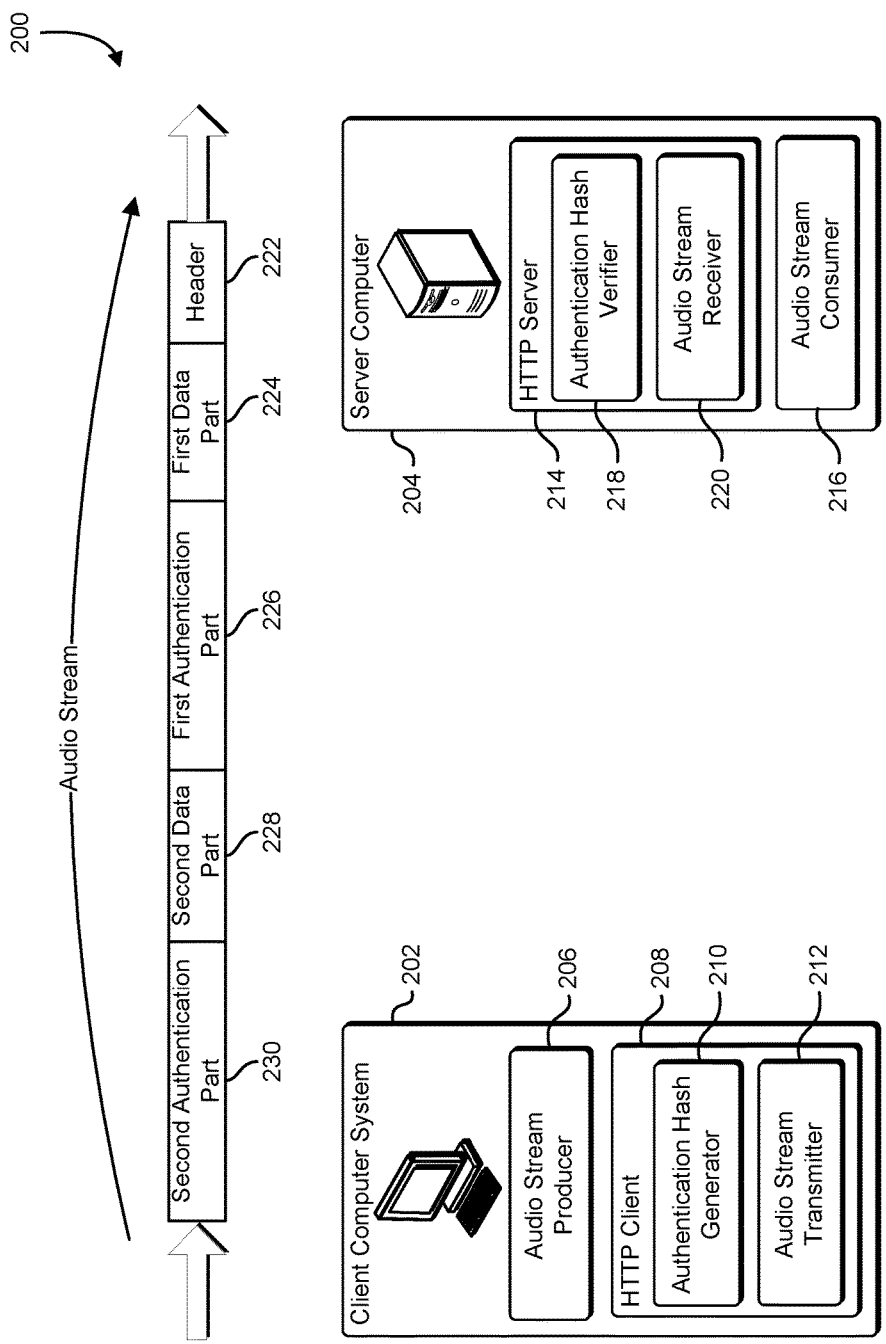
FIG. 2 shows one embodiment of an audio stream transmitted from an audio stream producer running on a client computer system to an audio stream consumer running on a server computer system.

FIG. 2 shows one embodiment of an audio stream transmitted from an audio stream producer running on a client computer system to an audio stream consumer running on a server computer system. In one embodiment, a system diagram 200 shows a client computer system 202 that produces and sends real-time audio information to a server computer system 204. In one embodiment, the client computer system 202 hosts an audio stream producer 206. In one embodiment, the audio stream producer 206 is a service running on the client computer system 202. In one embodiment, the audio stream producer 206 acquires audio data in approximate real time from an audio source. In one embodiment, the audio stream producer samples voice audio from a microphone via an analog-to-digital converter on the client computer system 202. In one embodiment, the audio stream producer 206 provides the acquired audio data to an HTTP client 208. In one embodiment, the audio stream producer 206 buffers a portion of the audio stream data in a memory, and when the amount of audio stream data exceeds the threshold amount, the audio stream data is passed to the HTTP client 208. In one embodiment, the audio stream producer 206 buffers a portion of the audio stream data in a shared memory, and the shared memory is accessible by the HTTP client 208. In one embodiment, the audio stream producer 206 buffers the audio stream data in a memory and periodically transfers audio stream data to the HTTP client 208.

In one embodiment, the HTTP client 208 receives the audio stream data from the audio stream producer 206. In one embodiment, the HTTP client 208 is a service that manages the transmission of the audio data to the server computer system 204. In one embodiment, the HTTP claim 208 includes an authentication hash generator 210 and an audio stream transmitter 212. In one embodiment, when the HTTP client 208 receives audio stream data from the audio stream processor 206, the HTTP client 208 passes the audio stream data to the authentication hash generator 210 and the audio stream transmitter 212.

In one embodiment, the authentication hash generator 210 generates authentication information for the received audio stream data. In one embodiment, the authentication hash generator 210 generates a cryptographic hash for the received audio stream data. In one embodiment, the authentication hash generator 210 generates a message authentication code for the received audio stream data. In one embodiment, the authentication hash generator 210 generates a rolling hash for the received audio stream data. In one embodiment, a rolling hash can be determined by updating a previous hash using authentication information from newly received audio stream data. In one embodiment, the authentication hash generator 210 is initialized with a known initial rolling hash value. In one embodiment, for each piece of audio stream data received, the authentication hash generator 210 updates the rolling hash value to account for the new audio stream data. In one embodiment, when the audio stream producer 206 indicates that the audio stream is ending, or if the HTTP client 208 ends a particular content block of stream data, the authentication hash generator 210 uses the current rolling hash as authentication information which is sent to the server computer system 204 to verify the transmitted audio stream data.

In one embodiment, the audio stream transmitter 212 is a service that manages communication between the client computer system 202 and the server computer system 204. In one embodiment, the audio stream transmitter 212 establishes a network connection to the server computer system 204 and transmits the received audio stream data as multipart content. In one embodiment, the audio stream transmitter 212 implements a secure protocol such as transport layer security ("TLS") over which HTTP data is transmitted.

In one embodiment, the HTTP client 208 buffers data received from the audio stream producer 206 in a memory. In one embodiment, after the authentication hash generator 210 has updated the rolling hash, and after the audio stream transmitter 212 has transmitted the data to the server computer system 204, the HTTP client 208 deletes the buffer data from memory to reduce memory usage. In one embodiment, data received from the audio stream producer 206 is provided to the audio stream transmitter 212 and transmitted to the server computer system 204 before the authentication information is generated by the authentication hash generator 210 in order to reduce the delay between data collection and data processing at the server computer system 204. In the embodiment, the data is retained by the HTTP client 208 and deleted from memory after the authentication hash generator 210 updates any associated authentication information.

In one embodiment, the server computer system 204 includes an HTTP server 214 and an audio stream consumer 216. In one embodiment, the HTTP server 214 is a service that monitors incoming network connections for incoming audio stream data. In one embodiment, the HTTP server 214 is a Web server. In one embodiment, the audio stream consumer 216 is a service hosted by the server computer system 204. In one embodiment, the audio stream consumer 216 processes audio data received from the client computer system 202 via the HTTP server 214. In one embodiment, the audio stream consumer 216 processes the received audio stream to identify spoken words.

In one embodiment, the HTTP server 214 includes an authentication hash verifier 218 and an audio stream receiver 220. In one embodiment, the authentication hash verifier 218 receives authentication information from the client computer system and compares the received authentication information to corresponding authentication information generated from the incoming audio stream data. In one embodiment, the authentication information is a cryptographic hash, a checksum, or a message authentication code. In one embodiment, when the authentication hash verifier 218 determines that the received authentication information matches the corresponding authentication information generated from the incoming audio stream data, the authentication hash verifier 218 sends an indication to the audio stream consumer 216 indicating that the received audio stream data is valid. In one embodiment, the audio stream receiver 220 is a service running within the HTTP server 214 that receives the content parts containing audio data. In one embodiment, the audio stream receiver 220 converts the audio data into a format expected by the audio stream consumer 216 and forwards the data to the audio stream consumer 216 as the data is received. In one embodiment, the HTTP server 214 provides the audio data to both the authentication hash verifier 218 and the audio stream receiver 220. In one embodiment, the incoming audio data is buffered in a memory on the server computer system 204. In one embodiment, after the authentication hash verifier 218 has updated corresponding authentication information and the audio stream receiver 220 has provided the audio data to the audio stream consumer 216, buffered audio data can be deleted to reduce memory usage.

In one embodiment, in operation, the audio stream producer 206 samples and collects audio information from the environment, such as voice information collected via microphone connected to the client computer system 202. In one embodiment, the audio stream producer 206 collects forms of data such as video information, environmental sensor information, health sensor information, or sensor data. In one embodiment, the data collected by the audio stream producer 206 is sent to the HTTP client 208. In one embodiment, the authentication hash generator 210 updates a rolling hash from the data received from the audio stream producer 206 and the audio stream transmitter 212 forwards the data to the audio stream receiver 220 via an HTTP multipart request over a computer network. In one embodiment, the audio stream receiver 220 on the server computer system 204 receives the data, and provides the data to the authentication hash verifier 218 and the audio stream consumer 216. In one embodiment, the authentication hash verifier 218 determines authentication information that corresponds to the authentication information received from the client computer system 202. In one embodiment, if the authentication hash verifier 218 determines that the determined authentication information matches the received authentication information, the authentication hash verifier 218 provides the audio stream consumer 216 with an indication that the received data is valid.

A diagram of the HTTP multipart request is shown at the top of FIG. 2. In one embodiment, the HTTP multipart request includes a header 222, a first data part 224, the first authentication part 226, a second data part 228, and a second authentication part 230. In one embodiment, the header 222 includes information that describes the overall formatting of the request. In one embodiment, the header 222 includes a length field, a content-part identifier, a request type, and credential information. In one embodiment, the credential information includes a digital certificate, a digital signature, a biometric, username/password pair or information that is used by the server computer system 204 to authenticate the identity of the client computer system 202. In one embodiment, the first data part 224 includes audio data in a content part. In one embodiment, the first authentication part 226 includes authentication information associated with the first data part 224. In one embodiment, the first authentication part 226 includes a cryptographic hash, checksum, or message authentication code for the data in the first data part 224. In one embodiment, the second data part 228 includes audio data that follows the first data part 224 in time. In one embodiment, the second authentication part 230 is authentication information associated with the second data part 228. In one embodiment, the second authentication part 230 is determined using information in the first authentication part 226 and information in the second data part 228.

Figure 3:
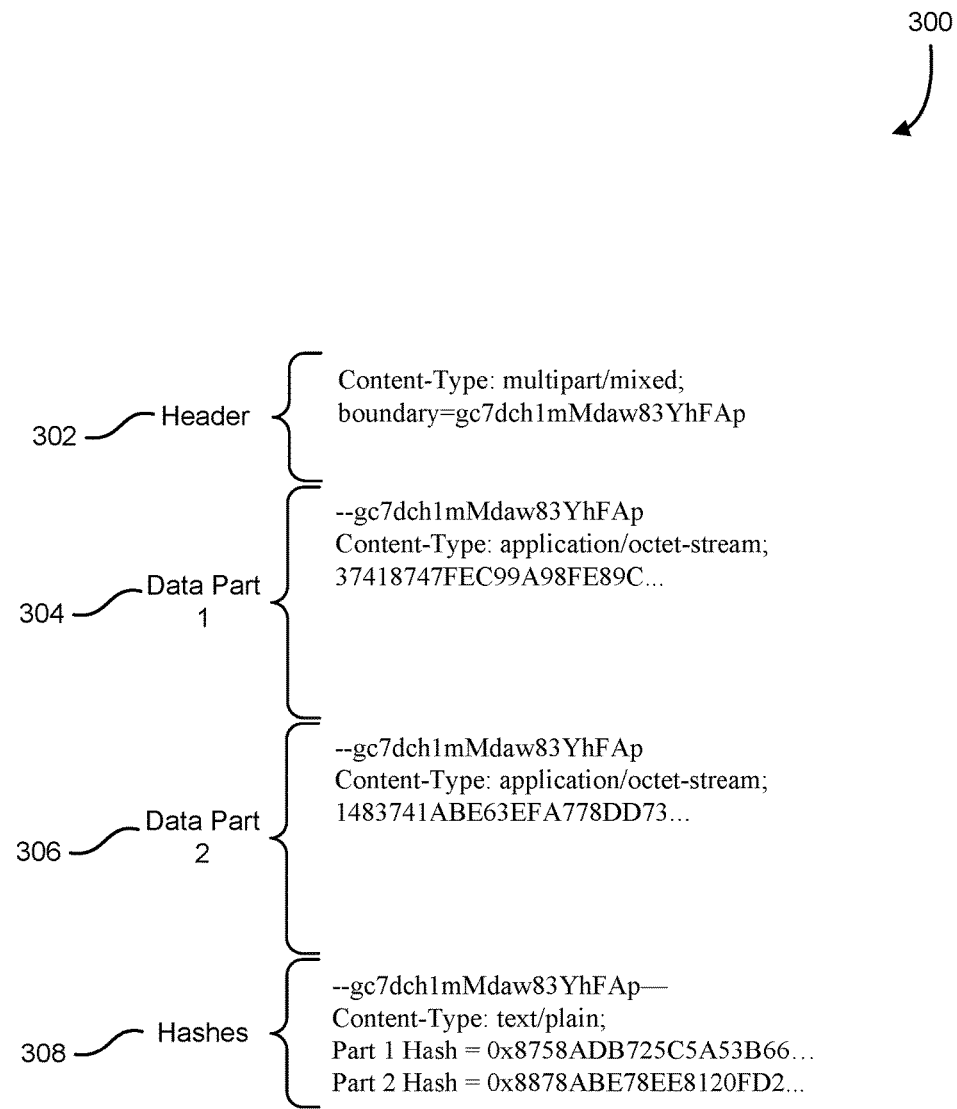
FIG. 3 shows one embodiment of a hypertext transport protocol ("HTTP") multipart content that represents an authenticated audio stream where authentication information is positioned after associated audio data.

FIG. 3 shows one embodiment of an HTTP multipart content that represents an authenticated audio stream where authentication information is positioned after associated audio data. A data diagram 300 illustrates an embodiment where an HTTP multipart response message that is transmitted from a client computer system to a server computer system. In one embodiment, the HTTP multipart response message includes a header 302 and three content parts: a first data content part 304, a second data content part 306, and a first authentication content part 308. In one embodiment, the header 302 includes a content-type tag indicating that the HTTP multipart response includes a number of content parts. In one embodiment, the header 302 specifies a boundary tag to be used as a separator between the content parts.

In one embodiment, the HTTP multipart response includes two data content parts. In one embodiment, the first data content part 304 includes data encoded in an octet-stream. In one embodiment, the data represents a first portion of data streamed from the client computer system to the server computer system. In one embodiment, the second data content part 306 represents a second portion of the data streamed from the client computer system to the server computer system. In one embodiment, the second portion of the data is acquired later in time than the first portion of the data. In one embodiment, the first authentication content part 308 includes a hash for each data content part. In one embodiment, in one embodiment, the hash for a particular data content part is a cryptographic hash based at least in part on the content of the particular data content part and a content-part identifier. In one embodiment, the hash for a particular data content part is a cryptographic hash based at least in part on the content of the particular data content part and the hash of the previous data content part. In one embodiment, the hash for a particular data content part is a cryptographic hash based at least in part on the content of the data content parts from the beginning of the HTTP multipart response to the particular data content part.

Figure 4:
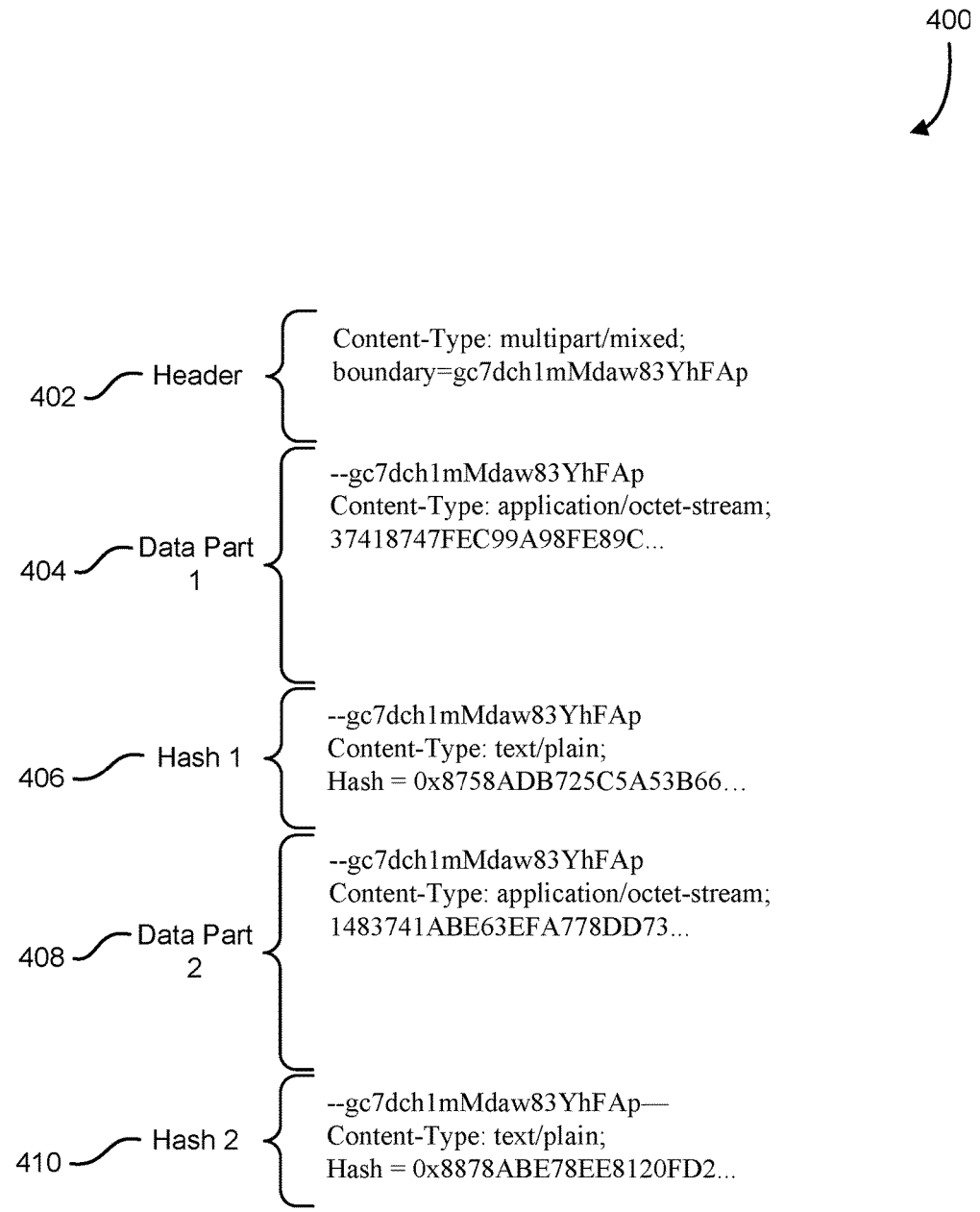
FIG. 4 shows one embodiment of an HTTP multipart content that represents an authenticated audio stream where authentication information is interspersed within audio stream data.

FIG. 4 shows one embodiment of an HTTP multipart content that represents an authenticated audio stream where authentication information is interspersed within audio stream data. A data diagram 400 illustrates an embodiment where an HTTP multipart response message that is transmitted from a client computer system to a server computer system. In one embodiment, the HTTP multipart response message includes a header 402 and three content parts: a first data content part 404, a first authentication content part 406, a second data content part 408, and a second authentication content part 410. In one embodiment, the header 402 includes a content-type tag indicating that the HTTP multipart response includes a number of content parts. In one embodiment, the header 402 specifies a boundary tag to be used as a separator between the content parts.

In one embodiment, the HTTP multipart response includes two data content parts. In one embodiment, the first data content part 404 includes data encoded in an octet-stream. In one embodiment, the data represents a first portion of data streamed from the client computer system to the server computer system. In one embodiment, the second data content part 408 represents a second portion of the data streamed from the client computer system to the server computer system. In one embodiment, the second portion of the data is acquired later in time than the first portion of the data. In one embodiment, the first authentication content part 406 includes a hash for the first data content part 404. In one embodiment, the second authentication content part 410 includes a hash for the second data content part 408. In one embodiment, each authentication content part contains a hash for the data content part immediately preceding the authentication content part. In one embodiment, the authentication information of each authentication part is based at least in part on the data in the immediately preceding authentication content part and the position of the data content part. In one embodiment, the authentication information of each authentication part is based at least in part on the authentication information of the previous data content part.

Figure 5:
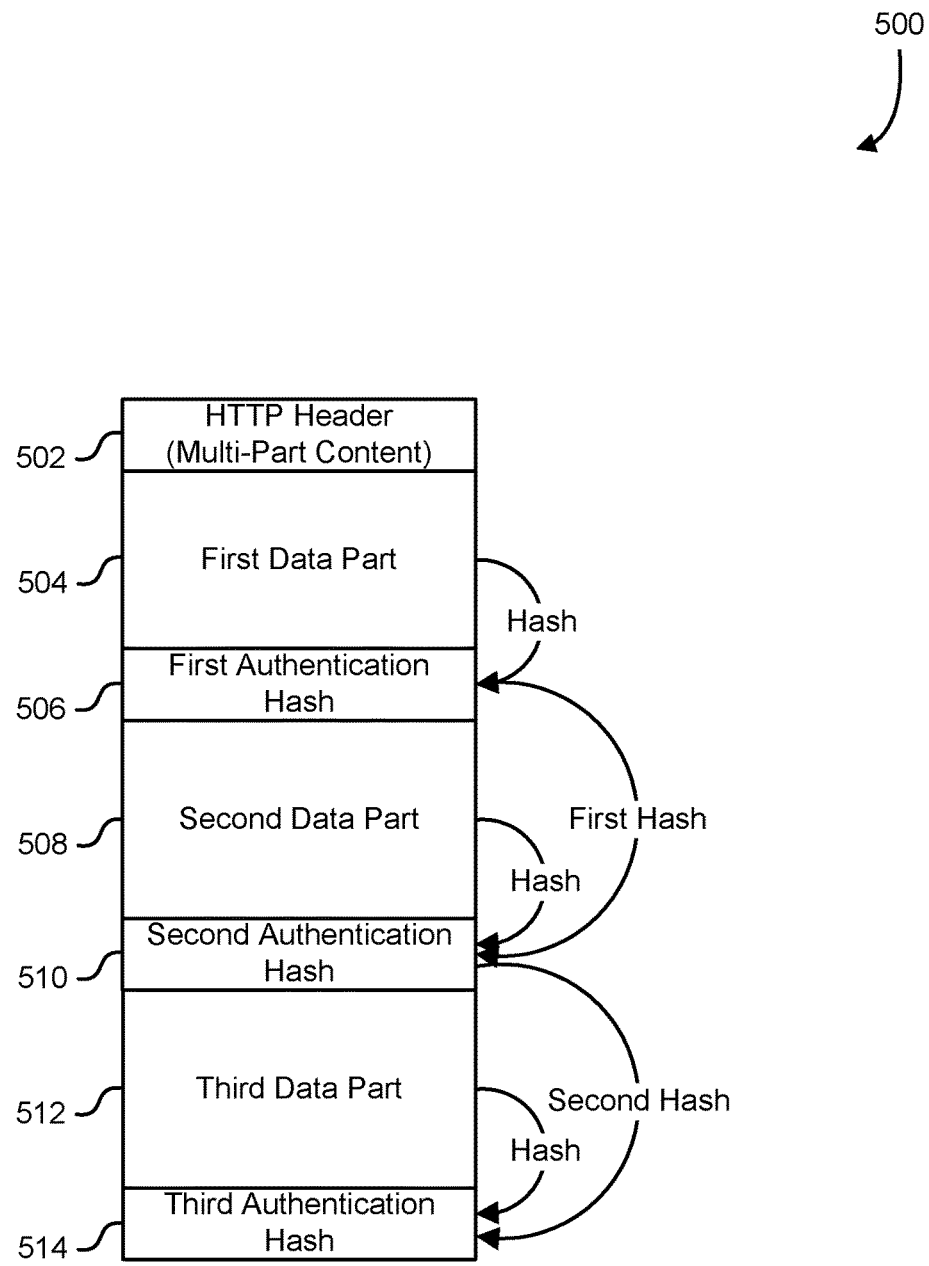
FIG. 5 shows one embodiment of authentication hashes interspersed in HTTP multipart content where each hash is based at least in part on a previous block of audio data and a previous hash.

FIG. 5 shows one embodiment of authentication hashes interspersed in HTTP multipart content where each hash is based at least in part on a previous block of audio data and a previous hash. A data diagram 500 illustrates how, in an embodiment, authentication hashes in different authentication content parts are interrelated to protect data integrity across the HTTP multipart response. In one embodiment, the HTTP multipart response includes an HTTP header 502 that designates the response as including multipart content. In one embodiment, after the header, the HTTP multipart response includes a first data content part 504 followed by an associated first authentication content part 506. In one embodiment, following the first authentication content part 506, the HTTP multipart response includes a second data content part 508 and an associated second authentication content part 510. In one embodiment, following the second authentication content part 510, the HTTP multipart response includes a third data content part 512 and an associated third authentication content part 514.

In one embodiment, each authentication content part includes authentication information that is based on the previous data content part and the previous authentication content parts. In one embodiment, the authentication information is a hash. In one embodiment, the first authentication content part 506 is a hash of the data in the first data content part 504. In one embodiment, the second authentication content part 510 is a hash of the data in the second data content part 508 and the first authentication content part 506. In one embodiment, the third authentication content part 514 is a hash of the third data content part 512 and the second authentication content part 510. In one embodiment, by basing each hash on information from the previous authentication content part, attackers are prevented from injecting additional content into the HTTP multipart response without being detected.

Figure 6:
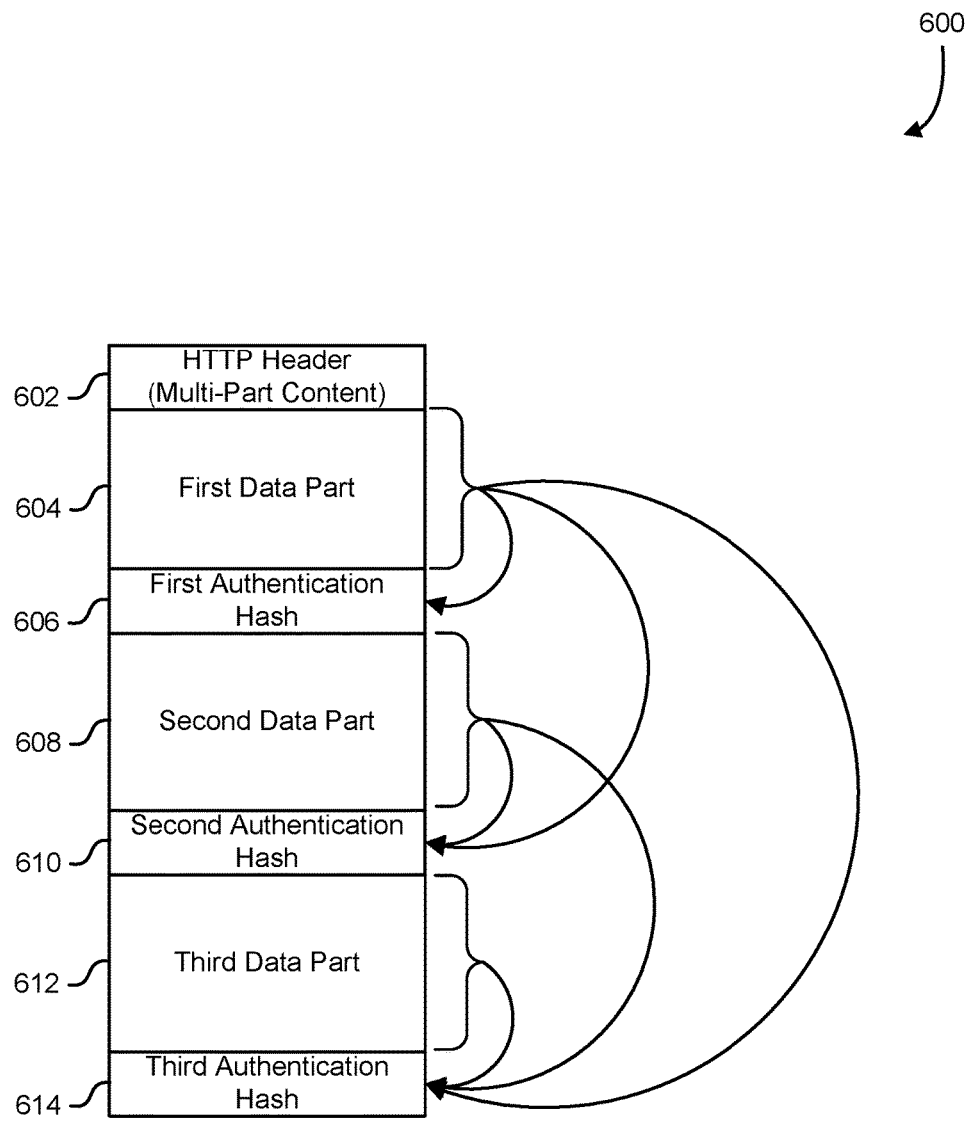
FIG. 6 shows one embodiment of authentication hashes interspersed in HTTP multipart content where each hash is based at least in part on cumulative audio data of a data stream.

FIG. 6 shows one embodiment of authentication hashes interspersed in HTTP multipart content where each hash is based at least in part on cumulative audio data of a data stream. A data diagram 600 illustrates an embodiment where authentication hashes in different authentication content parts are interrelated to protect data integrity across the HTTP multipart response. In one embodiment, the HTTP multipart response includes an HTTP header 602 that designates the response as including multipart content. In one embodiment, after the header, the HTTP multipart response includes a first data content part 604, followed by an associated first authentication content part 606. In one embodiment, following the first authentication content part 606, the HTTP multipart response includes a second data content part 608 and an associated second authentication content part 610. In one embodiment, following the second authentication content part 610, the HTTP multipart response includes a third data content part 612 and an associated third authentication content part 614.

In one embodiment, each authentication content part includes authentication information that is based on the previous data content part and the previous authentication content parts. In one embodiment, the authentication information is a hash. In one embodiment, the first authentication content part 606 is a hash of the data in the first data content part 604. In one embodiment, the second authentication content part 610 is a hash of the data in the second data content part 608 and the first data content part 604. In one embodiment, the third authentication content part 614 is a hash of the third data content part 612, the second data content part 608, and the first data content part 604. In one embodiment, by basing each hash on information from the previous data content part, attackers are prevented from injecting additional content into the HTTP multipart response without being detected.

Figure 7:
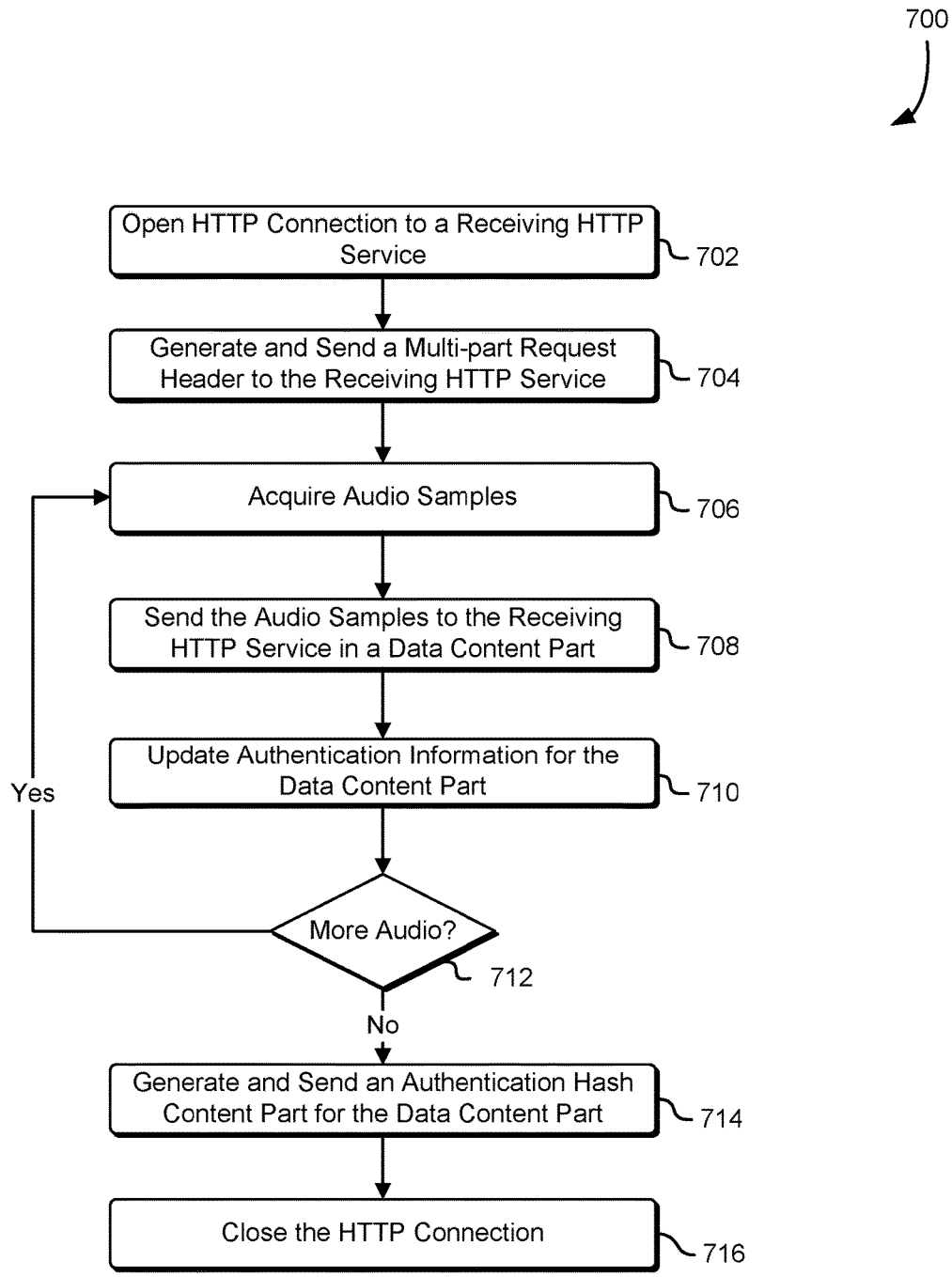
FIG. 7 shows one embodiment of a process that, when performed, encodes and transmits an authenticatable audio stream as HTTP multipart content.

FIG. 7 shows one embodiment of a process that, when performed, encodes and transmits an authenticatable audio stream as HTTP multipart content. A flowchart 700 illustrates an embodiment where a process that begins at block 702 with a client computer system opening an HTTP connection to a receiving HTTP service. In one embodiment, an HTTP client running on the client computer system receives a signal from a data-acquiring service requesting that a stream of data is to be sent to the receiving HTTP service. In one embodiment, as a result of receiving the request from the data-acquiring service, the HTTP client initiates the HTTP connection to the receiving HTTP service. In one embodiment, the HTTP client initiates a protected network connection such as a TLS connection to the receiving HTTP service. In one embodiment, the HTTP client and the receiving HTTP service may exchange digital certificates to authenticate their identities.

At block 704, in an embodiment, the client computer system generates and sends an HTTP multipart request header to the receiving HTTP service. In one embodiment, the request header identifies the request as an HTTP multipart request and specifies a boundary marker used to separate one or more content parts that follow the header. In one embodiment the header includes information that links the present HTTP multipart request with a previous HTTP multipart request. In one embodiment, the header includes a sequence number, identifier, or authentication information such as a hash, of the previous HTTP multipart request.

At block 706, the client computer system initiates a loop that acquires and sends data samples in a data content part. In one embodiment, at block 706, the client computer system acquires data samples. In one embodiment, the data is audio samples that are acquired from a real-time audio source such as a microphone connected to an analog-to-digital converter. In one embodiment, the data is environmental data such as temperature, humidity, ambient light, air or water flow, or motion. In one embodiment, the data is image or video data. In one embodiment, the data is encoded as discrete absolute samples. In one embodiment, the data is encoded as relative samples. In one embodiment, at block 708, the client computer system transmits the data samples in a data content part. In one embodiment, before the first data is transmitted, the client computer system sends a boundary tag to the receiving HTTP service, followed by a tag that identifies the encoding of the data samples. In one embodiment, the data samples are encoded as octets. In one embodiment, the data samples are encoded as binary coded decimal ("BCD") values. In one embodiment, after encoding the data samples in accordance with the encoding tag, the client computer system sends the encoded data samples to the HTTP service.

In one embodiment, at block 710, the client computer system updates authentication information for the data samples acquired at block 706. In one embodiment, the authentication information is a cryptographic hash. In one embodiment, the authentication information is a checksum or message authentication code. In one embodiment, the authentication information is a rolling hash that is created as the samples are acquired. In one embodiment, the rolling hash is an intermediate cryptographic hash, a checksum, sample count, or sum of the acquired data that is completed after the last data sample of the data content part is acquired. In one embodiment, the client computer system sends a boundary tag to separate the authentication content part from the previous data content part, and sends one or more additional tags containing the authentication information to the receiving HTTP service. In one embodiment, after updating the authentication information, the client computer system frees the memory used to buffer the acquired data to reduce memory use of the client computer system. By sending the audio samples to the receiving HTTP service as they are received, overall data latency is reduced in one embodiment.

In one embodiment, at decision block 712, the client computer system determines whether additional data samples are to be collected. In one embodiment, the client computer system determines whether additional samples are to be collected by comparing the total number of collected values to a threshold value. In one embodiment, the client computer system determines whether additional samples are to be collected by determining that the elapsed data collection time has exceeded the threshold value. In one embodiment, the client computer system determines whether additional samples are to be collected by examining the samples for a terminating characteristic. In one embodiment, the terminating characteristic may be a period of silence, a period of darkness, detection of motion or lack of motion, or an environmental value that is out of a predetermined acceptable range. In one embodiment, if the client computer system determines that additional data samples are to be collected, execution returns to block 706 where the client computer system acquires the additional data samples. In one embodiment, if the client computer system determines not to collect additional data samples, execution advances to block 714.

In one embodiment, at block 714, the client terminates the previous data content part by sending a boundary tag and sends the authentication information in an authentication content part. In one embodiment, the authentication information is be finalized by adding a data content part identifier or authentication information of previous data content parts to the authentication information. In one embodiment, hashes of one or more previous data content parts are added to the data and hashed to produce a final hash that is used as the authentication information.

In one embodiment, additional information is sent in the authentication content part. In one embodiment, the client sends an overall message length and hash for the HTTP multipart response. In one embodiment, the client sends the total number of content parts in the message. In one embodiment, the client indicates whether an additional HTTP multipart response should be expected following the present HTTP multipart response. In one embodiment, if an additional HTTP multipart response is expected, the client computer system sends a tag or identifier that identifies the following HTTP multipart response. In one embodiment, at block 716, the client computer system closes the HTTP connection to the receiving HTTP service.

Figure 8:
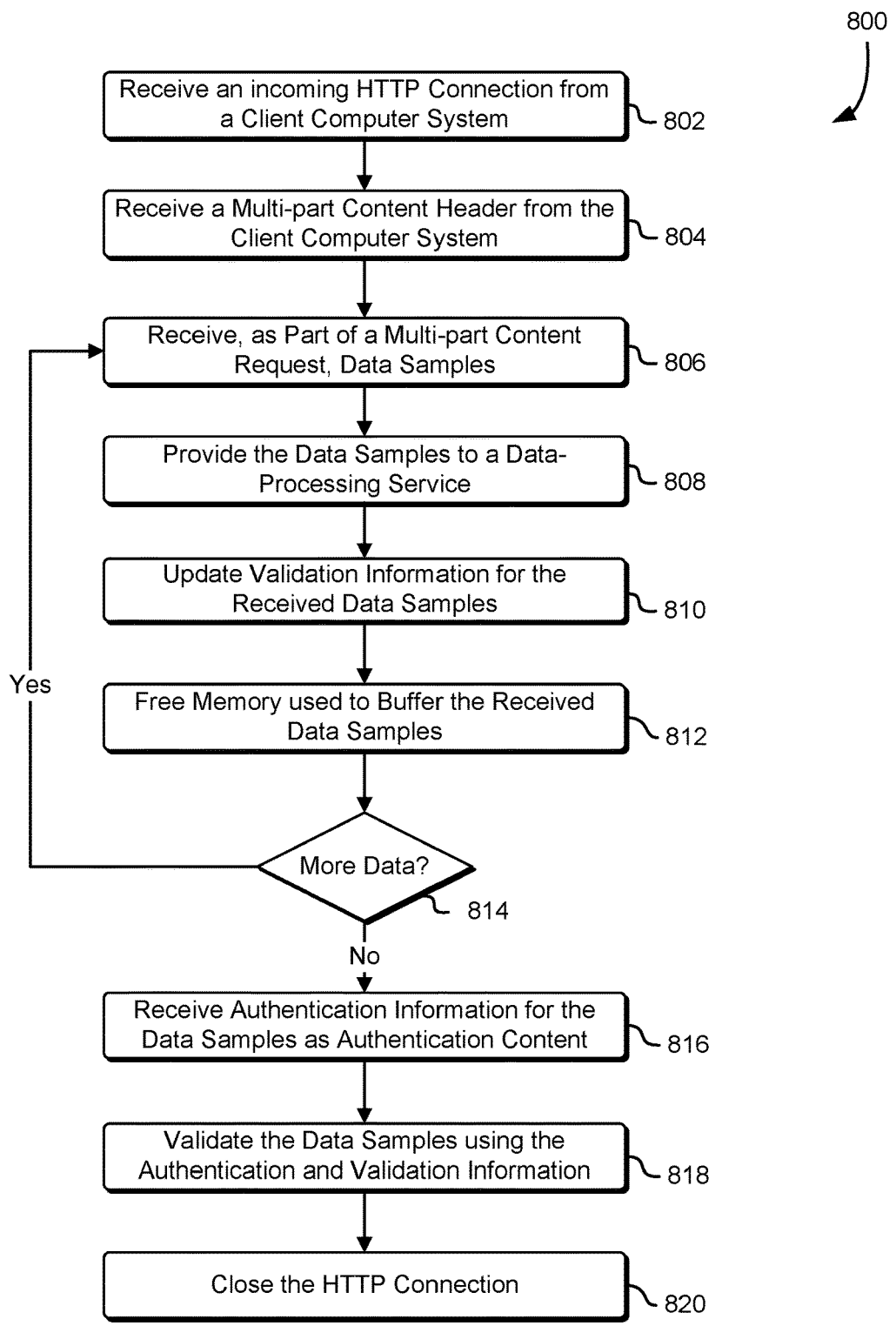
FIG. 8 shows one embodiment of a process that, when performed, receives and authenticates an authenticatable audio stream as HTTP multipart content.

FIG. 8 shows one embodiment of a process that, when performed by a receiving HTTP server, receives and authenticates an authenticatable data stream as HTTP multipart content. A flowchart 800 illustrates an embodiment where a process that begins at block 802 with the receiving HTTP server receiving an incoming HTTP connection from a client computer system. In one embodiment, the incoming HTTP connection is a secure hypertext transport protocol ("HTTPS") connection. In one embodiment, at block 804, the receiving HTTP server receives an HTTP request header from the client computer system. In one embodiment, the header identifies the request as an HTTP multipart request and specifies a boundary tag used for separating content parts of the multipart request.

In one embodiment, at block 806, the receiving HTTP server initiates a loop that receives data samples within a data content part. In one embodiment, prior to the first iteration of the loop, the receiving HTTP server receives a boundary tag and a content-type tag indicating the start of a data content part. In one embodiment, the receiving HTTP server receives one or more data samples from the client computer system. In one embodiment, at block 808, the receiving HTTP server provides the received data samples to a data processing service. In one embodiment, the data processing service is a service hosted on the HTTP server or another server in communication with the HTTP server. In one embodiment, the data processing service is a voice-processing service and the data samples represent audio samples collected by the client computer system. In one embodiment, at block 810, the receiving HTTP server updates validation information for the received data samples. In one embodiment, the validation information is generated using an algorithm corresponding to the algorithm that generated the authentication information on the client computer system. In one embodiment, the validation information is a rolling hash of the incoming data samples that, when complete, is compared against authentication information received from the client computer system. In one embodiment, the validation information and intermediate value are associated with generating a cryptographic hash, checksum, cyclic redundancy code, or message authentication code. In one embodiment, at block 812, memory used to buffer the received data samples is optionally freed for general use by the receiving HTTP server. In one embodiment, by providing the data samples to the data processing service before the validation information is finalized, latency between the reception of the data samples and processing of the data samples is reduced.

In one embodiment, at decision block 814, the receiving HTTP server determines whether additional data is to be received. In one embodiment, the determination is made by detecting a boundary tag indicating the end of the data content part. In one embodiment, if the receiving HTTP server determines that additional data is to be received, execution returns to block 806 and additional data samples are received from the client computer system. In one embodiment, if the receiving HTTP server determines that additional data is not to be received, execution advances to block 816.

In one embodiment, at block 816, the receiving HTTP server receives authentication information from the client computer system as an authentication content part. In one embodiment, the authentication content part includes a cryptographic hash, a hash, a checksum, a cyclic redundancy code, or message authentication code for the data samples in the previous data content part. In one embodiment, at block 818, the receiving HTTP server uses the validation information updated in block 810 to validate the received data samples. In one embodiment, if the validation information updated in block 810 matches the authentication information received from the client computer system, the receiving HTTP server determines that the received data samples are valid, and notifies the data processing service that the data samples provided to the data processing service are valid. In one embodiment, if the validation information updated in block 810 does not match the authentication information received from the client computer system, the receiving HTTP server determines that the received data samples were not valid and notifies the data processing service that the data samples are invalid.

In one embodiment, at block 820, the receiving HTTP server receives a connection termination request from the client computer system, and closes the HTTP connection. In one embodiment, the client computer system initiates another data content part and execution returns to block 806 where additional data samples are received, processed, and validated. In an additional embodiment, the client computer system terminates the present HTTP multipart request, and initiates a new HTTP multipart request containing data samples and authentication information. In an additional embodiment, the receiving HTTP server receives a new HTTP connection from a client computer system and receives another HTTP multipart request.

Figure 9:
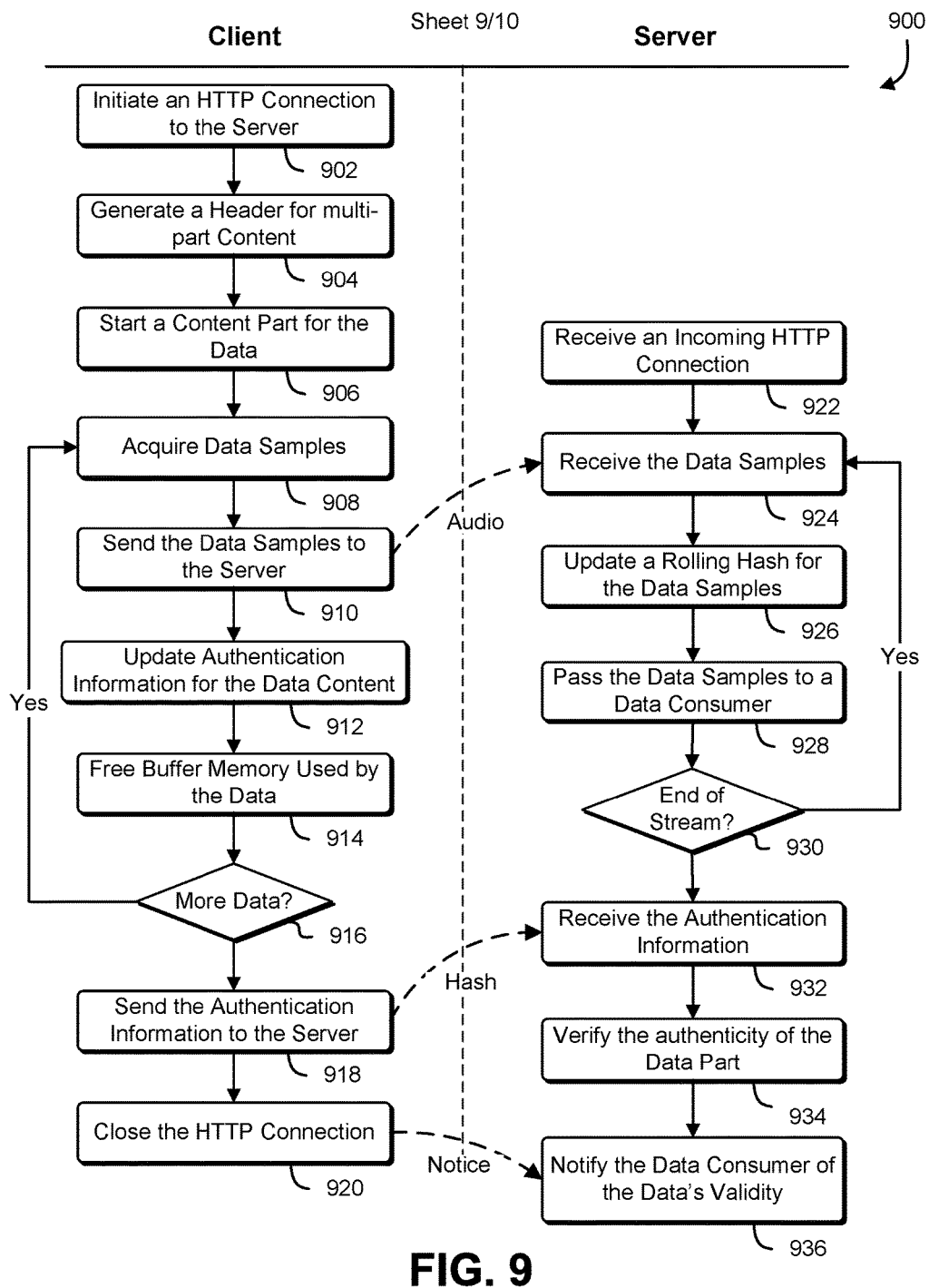
FIG. 9 shows one embodiment of a process that, when performed by a client and a server, acquires and transmits an authenticated audio stream from the client to the server.

FIG. 9 shows one embodiment of a process that, when performed by a client and a server, acquires and transmits an authenticated audio stream from the client to the server. A swim diagram 900 illustrates an embodiment where a process that begins at block 902 with the client computer system initiating an HTTP connection to a server. In one embodiment, at block 904, the client computer system generates and sends a header for an HTTP multipart request. In one embodiment, at block 906, the client initiates a data content part by sending a separator tag and a content-encoding tag to the server.

In one embodiment, at block 908, the client initiates a loop that acquires data and sends the data to the server. In one embodiment, at block 908, the client acquires data samples. In one embodiment the data samples represent audio information, voice information, environmental monitoring information, video information, medical device information, or real-time data. In one embodiment, at block 910, the data samples are transmitted to the server over the HTTP connection. In one embodiment, at block 912, the client updates authentication information for the data content part to account for the newly acquired data samples. In one embodiment, the authentication information is a checksum, a cyclic redundancy code, a hash, a cryptographic hash, or message authentication code. In one embodiment, at block 912, the authentication information is updated to account for the newly acquired data samples but may not be complete and may not represent the final authentication information for the data content part until the loop is complete. In one embodiment, at block 914, buffer memory associated with the data samples is optionally freed for use by the client for other purposes.

In one embodiment, at decision block 916, the client determines whether additional data samples are to be collected. In one embodiment, the client determines whether additional data samples are to be collected based at least in part on a pattern within the samples such as a gap of silence in audio stream. In one embodiment, the client determines whether additional data samples are to be collected based at least in part on the number of total samples collected or the amount of time over which data samples are collected. In one embodiment, the client determines that additional data samples are not to be collected because the length of the current data content part has reached a predetermined size. In one embodiment, if the client determines that additional data is to be collected, execution returns to block 908 and additional data samples are collected. In one embodiment, if the client determines that additional data is not to be collected, execution advances to block 918.

In one embodiment, at block 918, the client uses the intermediate authentication information determined in block 912 to generate final authentication information and sends the final authentication information to the server. In one embodiment, the final authentication information is determined by sending the intermediate authentication information to the server. In one embodiment, the final authentication information is determined by adding hashes of previous data content parts to the data and updating the authentication information accordingly. In one embodiment, after sending the authentication information to the server, the client sends a boundary tag to the server and closes 920 the HTTP connection. In one embodiment, by processing the incoming data samples in this way, latency and memory buffer use is reduced.

In one embodiment, blocks 922 through 936 illustrate the steps taken by the receiving server to receive and forward the sample data to a data consuming process. In one embodiment, at block 922, the server receives an incoming HTTP connection. In one embodiment, the server receives a header indicating an HTTP multipart request and a boundary tag and content-type tag for a data content part. In one embodiment, at block 924, the server receives data samples that are encoded in accordance with the content-type tag from the client. In one embodiment, at block 926, the server updates a rolling hash for the received data samples. In one embodiment, the rolling hash is used as verification information that will be compared to authentication information received from the client a later time. In one embodiment, the rolling hash is an intermediate value associated with a checksum, a cyclic redundancy code, a hash, a cryptographic hash, or a message authentication code. In one embodiment, at block 928, the server provides the received data samples to a data consuming service. In one embodiment, the data consuming service is an audio processing service, a video processing service, an environmental monitoring service, health monitoring service, or service that makes use of the data acquired by the client computer system. In one embodiment, at decision block 930, the server determines whether additional data is to be expected from the client. In one embodiment, the server determines whether additional data is to be expected by looking for the presence of a boundary tag in the data sent from the client computer system. In one embodiment, if the server does not detect a boundary tag, execution returns to block 924 and the received information is interpreted as additional data samples. In one embodiment, if the server detects a boundary tag, the server interprets this as the end of the data content part and execution advances to block 932.

In one embodiment, at block 932, the server receives the authentication information in an authentication content part from the client. In one embodiment, at block 934, the server uses the rolling hash determined at block 926 to generate verification information that can be compared to the authentication information received from the client. In one embodiment, the server processes the rolling hash in accordance with the methods used by the client. In one embodiment, if the client combines the authentication information with authentication information from previous data content parts, the server also combines the rolling hash with authentication information from matching data content parts. In one embodiment, if the authentication information received from the client matches the rolling hash information determined by the server, the server determines that the data samples are authentic. In one embodiment, if the rolling hash does not match the received authentication information, the data samples are not authentic. In one embodiment, at block 936, the server indicates to the data consumer whether or not the data samples are authentic. In one embodiment, the data consumer processes the incoming data as the data is received from the server, but wait until the server indicates validity of the data before committing irreversible actions based at least in part on the incoming data. In this way, in one embodiment, system latency is reduced.

Figure 10:
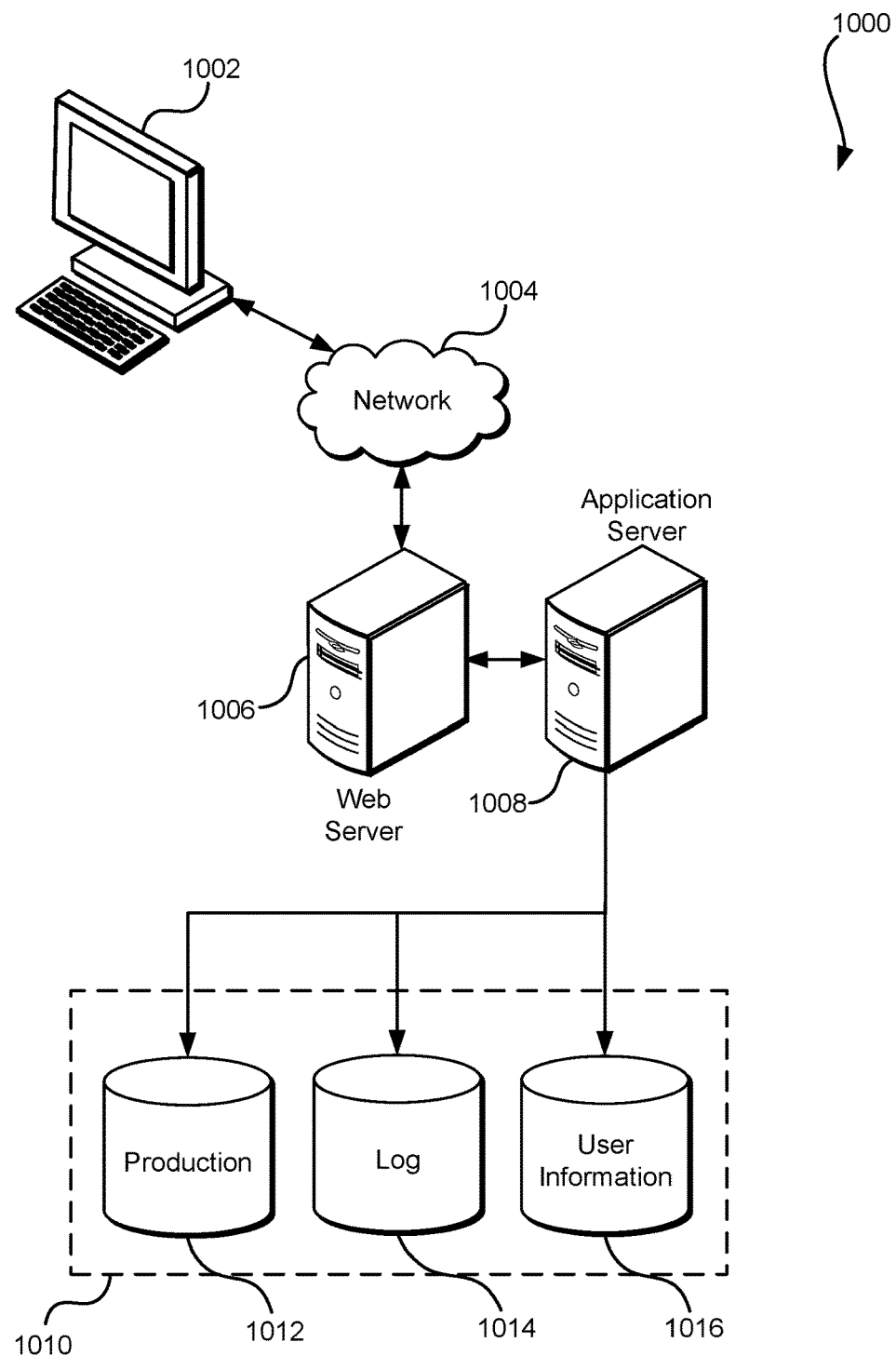
FIG. 10 illustrates an environment in which one embodiment can be implemented.

FIG. 10 illustrates an environment 1000 for implementing aspects in accordance with one embodiment. In one embodiment, a web-based environment is used. The environment includes an electronic client device 1002, which can include any appropriate device operable to send and/or receive requests, messages, or information over an appropriate network 1004 and, in one embodiment, convey information back to a user of the device. In an embodiment, client devices include personal computers, cell phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network, or any other such network and/or combination thereof. In an embodiment, components used for such a system can depend at least in part on the type of network and/or environment selected. In one embodiment, communication over the network can be enabled by wired or wireless connections and combinations thereof. In one embodiment, the network includes the Internet and/or publicly addressable communications network, as the environment includes a web server 1006 for receiving requests and serving content in response thereto. In one embodiment, an alternative device serving a similar purpose is used for other networks.

In one embodiment, the illustrative environment includes at least one application server 1008 and a data store 1010. In one embodiment, there are several application servers, layers, or other elements, processes, or components, which may be chained or otherwise configured, which can interact to perform tasks such as obtaining data from an appropriate data store. Servers, as used herein, can be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing, and retrieving data, which may include any combination and number of data servers, databases, data storage devices, and data storage media, in any standard, distributed, virtual, or clustered environment. In an embodiment, the application server can include any appropriate hardware, software, and firmware that integrates with the data store as needed to execute aspects of one or more applications for the client device, handling some or all of the data access and business logic for an application. In one embodiment, the application server provides access control services in cooperation with the data store and is able to generate content including, but not limited to, text, graphics, audio, video, and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. In one embodiment, content transferred to a client device is processed by the client device to provide the content in one or more forms including, but not limited to, forms that are perceptible to the user audibly, visually, and/or through other senses. In one embodiment, the handling of requests and responses, and the delivery of content between the client device 1002 and the application server 1008, is handled by the web server using PHP: Hypertext Preprocessor ("PHP"), Python, Ruby, Perl, Java, HTML, XML, JSON, and/or another appropriate server-side structured language. Further, operations described herein as being performed by a single device may, unless otherwise clear from context, be performed collectively by multiple devices, which may form a distributed and/or virtual system.

In one embodiment, the data store 1010 includes several separate data tables, databases, data documents, dynamic data storage schemes, and/or other data storage mechanisms and media for storing data relating to a particular aspect of the present disclosure. In one embodiment, the data store illustrated includes mechanisms for storing production data 1012 and user information 1016, which can be used to serve content for the production side. In one embodiment, the data store is shown to include a mechanism for storing log data 1014, which can be used for reporting, analysis, or other such purposes. In one embodiment, other aspects may be stored in the data store, such as page image information and access rights information, which can be stored in any of the above listed mechanisms as appropriate or in additional mechanisms in the data store 1010. In one embodiment, the data store 1010 is operable, through logic associated therewith, to receive instructions from the application server 1008 and obtain, update, or otherwise process data in response thereto. In one embodiment, the application server 1008 provides static, dynamic, or a combination of static and dynamic data in response to the received instructions. In one embodiment, dynamic data, such as data used in web logs (blogs), shopping applications, news services, and other such applications is generated by server-side structured languages as described herein or may be provided by a content management system ("CMS") operating on, or under the control of, the application server. In one embodiment, a user, through a device operated by the user, submits a search request for a certain type of item, and the data store accesses the user information to verify the identity of the user and can access the catalog detail information to obtain information about items of that type, and then the information is returned to the user. In one embodiment, the information is returned as a results listing on a web page that the user is able to view via a browser on the client device 1002. In one embodiment, information for a particular item of interest is viewed in a dedicated page or window of the browser. The present disclosure is not limited to the context of web pages, and may be applicable to processing requests in general where the requests are not requests for content.

In one embodiment, a server includes an operating system that provides executable program instructions for the general administration and operation of that server and further includes a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. In one embodiment, such a system could have a fewer or a greater number of components than are illustrated in FIG. 10. Thus, the depiction of the system 1000 in FIG. 10 should be taken as being illustrative in nature and not limiting to the scope of the disclosure.

An embodiment can be implemented in a wide variety of operating environments, which in some cases can include one or more user computers, computing devices, or processing devices which can be used to operate any of a number of applications. User or client devices can include any of a number of computers, such as desktop, laptop, or tablet computers running a standard operating system, as well as cellular, wireless, and handheld devices running mobile software and capable of supporting a number of networking and messaging protocols. An embodiment can also include a number of workstations running any of a variety of commercially available operating systems and other known applications for purposes such as development and database management. These devices also can include other electronic devices, such as dummy terminals, thin-clients, gaming systems, and other devices capable of communicating via a network. These devices also can include virtual devices such as virtual machines, hypervisors, and other virtual devices capable of communicating via a network.

An embodiment can utilize at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In one embodiment, connection-oriented protocols may be used to communicate between network endpoints. Connection-oriented protocols (sometimes called connection-based protocols) are capable of transmitting data in an ordered stream. Connection-oriented protocols can be reliable or unreliable. In one embodiment, the protocol is a reliable connection-oriented protocol such as TCP. In one embodiment, the protocol is an unreliable connection-oriented protocol such as Asynchronous Transfer Mode ("ATM") or Frame Relay. Connection-oriented protocols are in contrast to packet-oriented protocols such as UDP that transmit packets without a guaranteed ordering.

In an embodiment that utilizes a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. In one embodiment, the server(s) are capable of executing programs or scripts in response to requests from user devices, such as by executing one or more web applications that may be implemented as one or more scripts or programs written in any programming language, such as Java®, C, C#, or C++, or any scripting language, such as Ruby, personal home page ("PHP"), Perl, Python, or test control language ("TCL"), as well as combinations thereof. In one embodiment, the server(s) include one or more database servers, including without limitation those commercially available from Oracle °, Microsoft °, Sybase and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. In one embodiment, these reside in a variety of locations, such as on a storage medium local to (and/or resident in) one or more of the computers or remote from any or all of the computers across the network. In one embodiment, the information may reside in a storage-area network ("SAN") familiar to those skilled in the art. In one embodiment, files for performing the functions attributed to the computers, servers, or other network devices may be stored locally and/or remotely, as appropriate. In one embodiment where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. In one embodiment, the system and various devices include a number of software applications, modules, services, or other elements located within at least one working memory device, including an operating system and application programs, such as a client application or web browser. In one embodiment, customized hardware is used and/or particular elements are implemented in hardware, software (including portable software, such as applets), or both. In one embodiment, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage, and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices or any other medium which can be used to store the desired information and which can be accessed by the system device.

In the preceding and following description, various techniques are described. For purposes of explanation, specific configurations and details are set forth in order to provide a thorough understanding of possible ways of implementing the techniques. However, the techniques described below may be practiced in different configurations without the specific details. Furthermore, well-known features may be omitted or simplified to avoid obscuring the techniques being described.

The specification and drawings are, accordingly, to be regarded in an illustrative rather than a restrictive sense. Various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain embodiments thereof are shown in the drawings and have been described above in detail. There is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed material (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: $\{A\}$, $\{B\}$, $\{C\}$, $\{A, B\}$, $\{A, C\}$, $\{B, C\}$, $\{A, B, C\}$. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. In one embodiment, the code is stored on a computer-readable storage medium in the form of a computer program comprising a plurality of instructions executable by one or more processors. The computer-readable storage medium may be non-transitory. In one embodiment, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in one embodiment, the executable instructions are executed such that different instructions are executed by different processors. In one embodiment, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in one embodiment, computer systems are configured to implement one or more services that singly or collectively perform operations of processes described herein. Such computer systems may, for instance, be configured with applicable hardware and/or software that enable the performance of the operations. In one embodiment, a computer system is a single device. In one embodiment, a computer system is a distributed computer system comprising multiple devices that operate such that the distributed computer system performs the described operations and a single device might not perform all of the described operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art on reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

What is claimed is:

1. A non-transitory computer-readable storage medium having stored thereon executable instructions that, as a result of being executed by one or more processors of a computer system, cause the computer system to at least:

establish a Hypertext Transport Protocol ("HTTP") connection to a service;
   send a header of an HTTP multipart request to the service via the HTTP connection;
   acquire data representing a portion of a content stream;
   after sending the header, send the data to the service via the HTTP connection as a first part of the HTTP multipart request;
   determine an authentication code for the portion of the content stream; and
   send the authentication code to the service via the HTTP connection as a second part of the HTTP multipart request after sending the first part.

2. The non-transitory computer-readable storage medium of claim 1, wherein the executable instructions further cause the computer system to at least:

acquire additional real time data representing an additional portion of the content stream;
   send the additional real time data to the service via the HTTP connection as a third content part of the HTTP multipart request after the second part of the HTTP multipart request;
   determine an additional authentication code that is capable of authenticating the real time data and the additional real time data; and
   send the additional authentication code to the service via the HTTP connection as a fourth content part of the HTTP multipart request after sending the third content part.

3. The non-transitory computer-readable storage medium of claim 2, wherein:

the authentication code is a cryptographic hash of the real time data; and
   the additional authentication code is a cryptographic hash of a concatenation of the real time data and the additional real time data.

4. The non-transitory computer-readable storage medium of claim 2, wherein:

the authentication code is a cryptographic hash of the real time data; and
   the additional authentication code is a cryptographic hash of a combination of the authentication code and the additional real time data.

5. A computer system, comprising:

one or more processors; and
   memory to store computer-executable instructions that, if executed, cause the one or more processors to:
      receive, in a first part of a multipart request, a block of data that is a portion of a data stream, the data stream comprising data in addition to the block of data;
      receive, in a second content part of the multipart request, an authentication code for the block of data; and
      validate the block of data using the authentication code.

6. The system of claim 5, wherein:

the computer-executable instructions further cause the one or more processors to receive a header of the multipart request; and
   the header includes information linking the multipart request to another multipart request.

7. The system of claim 5, wherein:

the computer-executable instructions further cause the one or more processors to receive an additional block of data that is a portion of the data stream;
   the additional data block is received in a third content part; and the authentication code is based at least in part on the additional block of data.

8. The system of claim 7, wherein:
the third content part is part of an additional multipart request;
the additional multipart request includes an additional authentication code capable of being used to validate the additional data block; and
the authentication code is based at least in part on the additional authentication code.

9. The system of claim 5, wherein:
the block of data represents audio information acquired by a data collection service in real time; and
the block of data is received from the data collection service in real time.

10. The system of claim 5, wherein:
a first portion of the block of data is received in real-time from a client computer system; and
the computer-executable instructions further cause the one or more processors to provide the first portion of the block of data to a data-consuming service before validating the block of data.

11. The system of claim 10, wherein:
the computer-executable instructions further cause the one or more processors to determine, from the first portion of the block of data, an intermediate authentication code; and
the authentication code is based at least in part on the intermediate authentication code.

12. The system of claim 11, wherein:
the multipart request is an HTTP multipart request having a plurality of content parts; and
the plurality of content parts include a data content part and an authentication content part.

13. A computer-implemented method, comprising:
providing a request header to a service, the request header indicating presence of multipart content in a multipart request;
acquiring data representing a portion of a data stream;
providing the data to the service as a first content part of the multipart request;
determining an authentication code for the portion of the data stream; and
providing the authentication code to the service as a second content part of the multipart request.

14. The computer-implemented method of claim 13, wherein:
the multipart request is an HTTP multipart request having a plurality of content parts; and
the plurality of content parts include a data content part and an authentication content part.

15. The computer-implemented method of claim 13, further comprising:
establishing a protected network connection to the service; and
wherein the data and the authentication code are provided to the service via a protected network connection.

16. The computer-implemented method of claim 13, wherein:
the data represents a portion of an audio stream that contains a voice audio; and
the data is collected in real time.

17. The computer-implemented method of claim 13, wherein the authentication code is a digital signature that includes a timestamp and a message authentication code.

18. The computer-implemented method of claim 13, wherein determining the authentication code occurs after providing the data to the service.

19. The computer-implemented method of claim 18, further comprising:
determining a rolling hash for a portion of the data; and
providing the portion of the data to the service after determining the rolling hash;
wherein the rolling hash is usable to authenticate the portion of the data;
the authentication code is determined at least in part on the rolling hash; and
the authentication code is determined without the portion of the data.

20. The computer-implemented method of claim 19, further comprising freeing a portion of memory used to buffer the portion of the data after determining the rolling hash and before determining the authentication code.

* * * * *